(12) United States Patent
Yin et al.

(10) Patent No.: US 11,467,930 B2
(45) Date of Patent: Oct. 11, 2022

(54) DISTRIBUTED FAILOVER OF A BACK-END STORAGE DIRECTOR

(71) Applicant: EMC IP Holding Company LLC, Hopkinton, MA (US)

(72) Inventors: Peng Yin, Southborough, MA (US); Ningdong Li, Acton, MA (US); Jiahui Wang, Framingham, MA (US); Shao Kuang Hu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 451 days.

(21) Appl. No.: 16/567,026

(22) Filed: Sep. 11, 2019

(65) Prior Publication Data
US 2021/0073092 A1    Mar. 11, 2021

(51) Int. Cl.
*G06F 11/20* (2006.01)
*G06F 3/06* (2006.01)

(52) U.S. Cl.
CPC ........ *G06F 11/2092* (2013.01); *G06F 3/0604* (2013.01); *G06F 3/0644* (2013.01); *G06F 3/0659* (2013.01); *G06F 3/0683* (2013.01); *G06F 2201/805* (2013.01)

(58) Field of Classification Search
CPC .. G06F 11/2092; G06F 3/0604; G06F 3/0644; G06F 3/0659; G06F 3/0683; G06F 2201/805
See application file for complete search history.

(56) References Cited

U.S. PATENT DOCUMENTS

| | | | |
|---|---|---|---|
| 8,380,954 B1 * | 2/2013 | Patil ................... | G06F 11/2094 711/162 |
| 9,946,485 B1 * | 4/2018 | Don .................... | G06F 11/2048 |
| 10,229,017 B1 * | 3/2019 | Zou .................... | G06F 11/2007 |
| 10,430,264 B2 * | 10/2019 | Borlick .............. | G06F 11/0727 |
| 10,528,437 B2 * | 1/2020 | Borlick .............. | G06F 11/0745 |
| 10,725,776 B2 * | 7/2020 | Hardy ................ | G06F 9/30003 |
| 10,949,277 B2 * | 3/2021 | Borlick .............. | G06F 11/0727 |
| 11,061,784 B2 * | 7/2021 | Borlick ................ | G06F 11/076 |
| 2007/0250410 A1 * | 10/2007 | Brignone ............ | G06Q 10/087 705/28 |
| 2013/0080901 A1 * | 3/2013 | Ahmed ............... | G06F 11/2041 715/736 |
| 2015/0006951 A1 * | 1/2015 | Gurram .............. | G06F 11/2028 714/4.12 |
| 2015/0234766 A1 * | 8/2015 | Weber ................... | H04L 49/101 710/317 |

(Continued)

*Primary Examiner* — Kamini B Patel
(74) *Attorney, Agent, or Firm* — Muirhead and Saturnelli, LLC (57) ABSTRACT

Distributed failover of a failed BE, and failback of the failed BE when it recovers, are described. A separate pool of memory may be reserved for each BE on a storage system. Each such pool may be further divided into sub-pools. When a BE fails, the one or more other active BEs on the storage system may be notified, and each such active BE may attempt to take ownership of one or more sub-pools of the BE and execute the one or more pending write operations of the failed BE. Upon completing execution of the pending write operations in a failed-over sub-pool, the ownership of the sub-pool may be returned to the failed BE. When the failed BE recovers, the recovered BE may attempt to take back control of one or more of its sub-pools.

20 Claims, 6 Drawing Sheets

(56) References Cited

U.S. PATENT DOCUMENTS

| | | | |
|---|---|---|---|
| 2016/0077938 A1* | 3/2016 | Keeriyadath | G06F 11/2005 |
| | | | 714/4.11 |
| 2018/0349217 A1* | 12/2018 | Borlick | G06F 11/0754 |
| 2018/0349237 A1* | 12/2018 | Borlick | G06F 11/076 |
| 2019/0303252 A1* | 10/2019 | Borlick | G06F 11/0745 |
| 2019/0332456 A1* | 10/2019 | Borlick | G06F 11/076 |
| 2021/0389896 A1* | 12/2021 | Gao | G06F 11/2094 |
| 2021/0390121 A1* | 12/2021 | Ratsaby | G06F 16/2246 |
| 2021/0392186 A1* | 12/2021 | Alshawabkeh | G06F 16/214 |

\* cited by examiner

| BE | Sub-pool | Sub-pool Owner |
|---|---|---|
| 1 | a | 1 |
| 1 | b | 1 |
| 1 | c | 1 |
| 1 | d | 1 |
| ... | ... | ... |
| 1 | p | 1 |

FIG. 7B

| BE | Sub-pool | Sub-pool Owner |
|---|---|---|
| 1 | a | 8 |
| 1 | b | 1 |
| 1 | c | 1 |
| 1 | d | 1 |
| ... | ... | ... |
| 1 | p | 1 |

FIG. 7C

| BE | Sub-pool | Sub-pool Owner |
|---|---|---|
| 1 | a | 8 |
| 1 | b | 16 |
| 1 | c | 1 |
| 1 | d | 1 |
| ... | ... | ... |
| 1 | p | 1 |

FIG. 7D

| BE | Sub-pool | Sub-pool Owner |
|---|---|---|
| 1 | a | 8 |
| 1 | b | 16 |
| 1 | c | 13 |
| 1 | d | 8 |
| ... | ... | ... |
| 1 | p | 1 |

FIG. 8A

| BE | Pool | Sub-pool |
|---|---|---|
| 8 | 8 | a |
| 8 | 8 | b |
| 8 | 8 | c |
| ... | | |
| 8 | 8 | d |

802 — 804a, 804b, 804c, 804d, 804e, 804f; 806 Pool; 808 Sub-pool; 810

FIG. 8B

| BE | Pool | Sub-pool |
|---|---|---|
| 8 | 8 | a |
| 8 | 8 | b |
| 8 | 8 | c |
| ... | | |
| 8 | 8 | d |
| 8 | 1 | a |

| BE | Pool | Sub-pool |
|---|---|---|
| 8 | 8 | a |
| 8 | 8 | b |
| 8 | 8 | c |
| 8 | 8 | d |
| ... | | |
| 8 | 8 | d |
| 8 | 1 | a |
| 8 | 1 | d |

| BE | Pool | Sub-pool |
|---|---|---|
| 8 | 8 | a |
| 8 | 8 | b |
| 8 | 8 | c |
| 8 | 8 | d |
| ... | | |
| 8 | 8 | d |
| 8 | 1 | a |
| 8 | 1 | d |
| 8 | 3 | c |

802 — 804a–804i

DISTRIBUTED FAILOVER OF A BACK-END STORAGE DIRECTOR

BACKGROUND

Technical Field

This application generally relates to data storage systems, and more particularly to back-end storage directors of data storage device of a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In some embodiments of the invention, a method is provided for a storage system including a plurality of physical storage devices, a plurality of directors processing I/O operations for the plurality of physical storage devices, and a memory including a plurality of pools of memory, each memory pool corresponding to a respective one of the plurality of directors and including a plurality of sub-pools for use by the respective director in the processing of I/O operations. The method includes receiving an indication that a first of the plurality of directors has failed, determining whether at least one of the plurality of sub-pools of a first memory pool corresponding to the first director includes pending write operations, assigning ownership of the at least one sub-pool to a second of the plurality of directors, and the second director processing the pending write operations of the at least one sub-pool.

The method may further include assigning ownership of at least one sub-pool of the first memory pool to a third of the plurality of directors.

The step of determining may include the second director determining, for at least two of the plurality of sub-pools of the first memory pool: whether another of the plurality of directors is assigned ownership of the sub-pool, and, if no other of the plurality of directors is assigned ownership of the sub-pool, assigning ownership of the sub-pool to the second director.

The step of determining whether at least one of the plurality of sub-pools of the first memory pool includes pending write operations may be performed separately by at least two of the plurality of directors, including the second director and excluding the first director.

The step of determining may include determining that at least two of the plurality of sub-pools of the first memory pool include pending write operations, and the method may further include maintaining ownership of at least one of the at least two sub-pools with the first director.

The method may further include the second director completing processing of the pending write operations of the at least one sub-pool, and, in response to the completion of the processing, re-assigning ownership of the at least one sub-pool back to the first director.

The method may further include: the first director becoming active again after having failed; determining which of the plurality of sub-pools of the first memory pool have ownership currently assigned to another of the plurality of directors; and, for each sub-pool of the first memory pool determined to have ownership currently assigned to another of the plurality of directors: determining whether the other director having ownership is active or failed, if the other director is failed, re-assigning ownership of the sub-pool back to the first director, and, if the other director is active, maintaining ownership of the sub-pool with the other director until completion by the other director of any pending write operations of the sub-pool.

Each of the plurality of directors may be communicatively coupled by a fabric to each of the plurality of physical storage devices.

In some embodiments, a data storage system includes a plurality of physical storage devices, a plurality of directors processing I/O operations with the plurality of physical storage devices, and a memory including a plurality of pools of memory, each memory pool corresponding to a respective one of the plurality of directors and including a plurality of sub-pools for use by the respective director in the processing of I/O operations, where the memory has code stored thereon that, when executed, performs the above-described method.

In some embodiments, one or more computer-readable media, for example, non-transitory computer-readable media, are provided having software stored thereon, where the software includes executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

A storage system may include a plurality of back-end adapters responsible for the management of I/O operations between the physical storage devices of the storage system and remainder of the storage system; i.e., for the back-end processing of I/O operations for the storage system. Back-end adapters are described in more detail elsewhere herein, and may be referred to herein as a back-end director or "BE."

In some storage systems, certain physical storage devices may only be accessed by certain BEs. That is, one or more BEs may be configured to exclusively manage I/O operations with one or more respective physical storage devices. For example, a first BE (or a first pair of BEs) may be the only BE(s) enabled to communicate with a first subset of the physical storage devices, and a second BE (or a second pair of BEs) may be the only BE(s) enabled to communicate with a second subset of the physical storage devices.

The storage system may have a memory shared by the BEs, e.g., global memory (GM), and each BE may have a portion of the GM pre-allocated to it; i.e., a pool of the memory reserved for it. One or more write operations for the physical storage devices exclusively served by a BE may be queued in the pool of global memory reserved for the BE, for example, in a RAID queue (RQ). A write operation (more specifically, an entry specifying the write operation) may remain in an RQ until all of the steps required to complete the write operation are completed, after which the entry may be removed from the queue. These steps may include the transmission of the data payload of the write operation to the one or more target physical storage devices, the exchange of any necessary additional communications between the one or more physical device and the director, and the calculation and storage of parity information (e.g., in accordance with RAID-5 or RAID-6) as a result of the write operation, which may be used to recover data stored on the one or more physical devices in the event of a failure of the storage system or a portion thereof. A write operation queued (e.g., in an RQ) in memory for execution by a director (e.g., a BE) may be referred to herein as a "pending write operation."

In some storage systems, if a BE fails for any reason (e.g., hardware, software, user input), another BE (e.g., the other BE of its pair) may take-over the pending write operations of the failed BE, e.g., in the BE's memory pool. That is, all of the pending write operations for a failed BE may failover to a single other BE. For example, a PowerMax™ storage system made available by Dell EMC may have multiple processing engines, each engine including two directors. If a director serving as a BE fails, all write operations queued in the reserved portion of GM for the failed director (e.g., in an RQ of the director) may failover to the other director of the engine. Furthermore, when the failed director recovers, i.e., becomes active again, write operations that have been failed-over to the other director, or at least those failed-over write operations that have not been initiated yet, may be failed back to (i.e., ownership thereof returned to) the original director.

For a storage system in which all pending write operations of a failed BE are failed over to a same BE, the failover process may be relatively slow, in particular if the target BE is already fairly busy, and may be limited by the available compute, memory and network resources of the target BE. Similarly, failback to the failed BE when it recovers may be slow for similar reasons, and may be limited by the available compute, memory and network resources of the target BE and the recovered BE. In some cases, it may take up to several seconds or even more for failback to complete. Further, performance of the BE to which all of the pending write operations are failed-over may be degraded as a result of the increased work, which consequently may affect the performance of the storage system overall.

What may be desirable is a faster way to failover pending write operations of a failed BE, and a faster way to failback to the failed BE when it becomes active again. What also may be desirable is a way to failover a BE that has less impact on system performance.

Described herein are improved techniques and mechanisms for failing over and failing back pending write operations of a BE, for example, in a distributed manner in which pending write operations are failed over to, and failed back from, multiple BEs concurrently (i.e., in parallel). The taking over (i.e., taking ownership for execution) of the pending write operations of a failed BE by one or more other BEs of a storage system may be referred to herein as the "failing over" of the BE, the write operations of the BE and/or a sub-pool of write operations of the BE. The process of multiple BEs at least attempting to take over of the pending write operations of a failed BE, for example, as described in more detail elsewhere herein, may be referred to herein as "distributed failover" of a BE. Similarly, the at least attempted taking back of failed-over write operations of a failed BE (e.g., taking over failed-over sub-pools) when it becomes active again may be referred to herein as the "failback" of the BE, the write operations of the BE and/or a sub-pool of pending write operations of the BE.

In some embodiments, a separate portion of memory (e.g., GM); i.e., a separate pool of memory, may be reserved for each BE on a storage system, where each memory pool may be of a same pre-defined size. Each such pool may be further divided into sub-portions (i.e., sub-pools), and each sub-portion may be of a same pre-defined size. In some embodiments, the number of sub-pools may be defined so be equal to the number (or maximum potential number) of BEs on the storage system, which may allow for maximum distribution of pending write operations of a failed BE, as is described in more detail elsewhere herein. For a given BE, pending write operations for the BE may be distributed (e.g., evenly and/or in accordance with a predefined algorithm) among the sub-pools of the BE.

When a BE fails, the one or more other active (i.e., enabled for use and not currently failed) BEs on the storage system may be notified, and each such active BE may attempt to take ownership of one or more pending writes of the failed BE. For example, each other active BE may attempt to take ownership of one or more sub-pools of the BE and execute the one or more pending write operations of the failed BE, which may result in distributed failover of the failed BE, as described in more detail elsewhere herein.

When the failed BE recovers (i.e., becomes active again), the recovered BE may attempt to take back control of one or more of its failed-over write operations from its sub-pools, for example, as described in more detail elsewhere herein.

In some embodiments, when a BE fails, at least one of its active sub-pools (i.e., sub-pools including at least one pending write operation) may not be failed-over to another BE, but rather reserved for the failed BE. By reserving at least one active sub-pool for the failed BE, the failed BE has at least one sub-pool of pending write operations to work on when it recovers, so that it does not remain idle in the event that, when it recovers, all other active sub-pools had been failed-over to other (currently active) BEs.

In some embodiments, after a first BE has failed, during or after one or more of its sub-pools have been failed-over to other BEs, one or more of the other BEs to which sub-pools have been failed-over may fail itself. In such embodiments, the additional failed BEs may be failed-over to the remaining active BEs in a same or similar manner as the first failed BE.

By distributing failover of a failed BE across multiple BEs of a storage system, the resources (e.g., compute, memory and network) of the multiple BEs may be utilized in the failover and failback of the failed BE, which may provide faster failover and failback, and which may result in less impact on system performance than if the failed BE were failed-over to only one BE.

Illustrative embodiments of the invention will now be described in more detail in relation to the figures.

Figure 1:
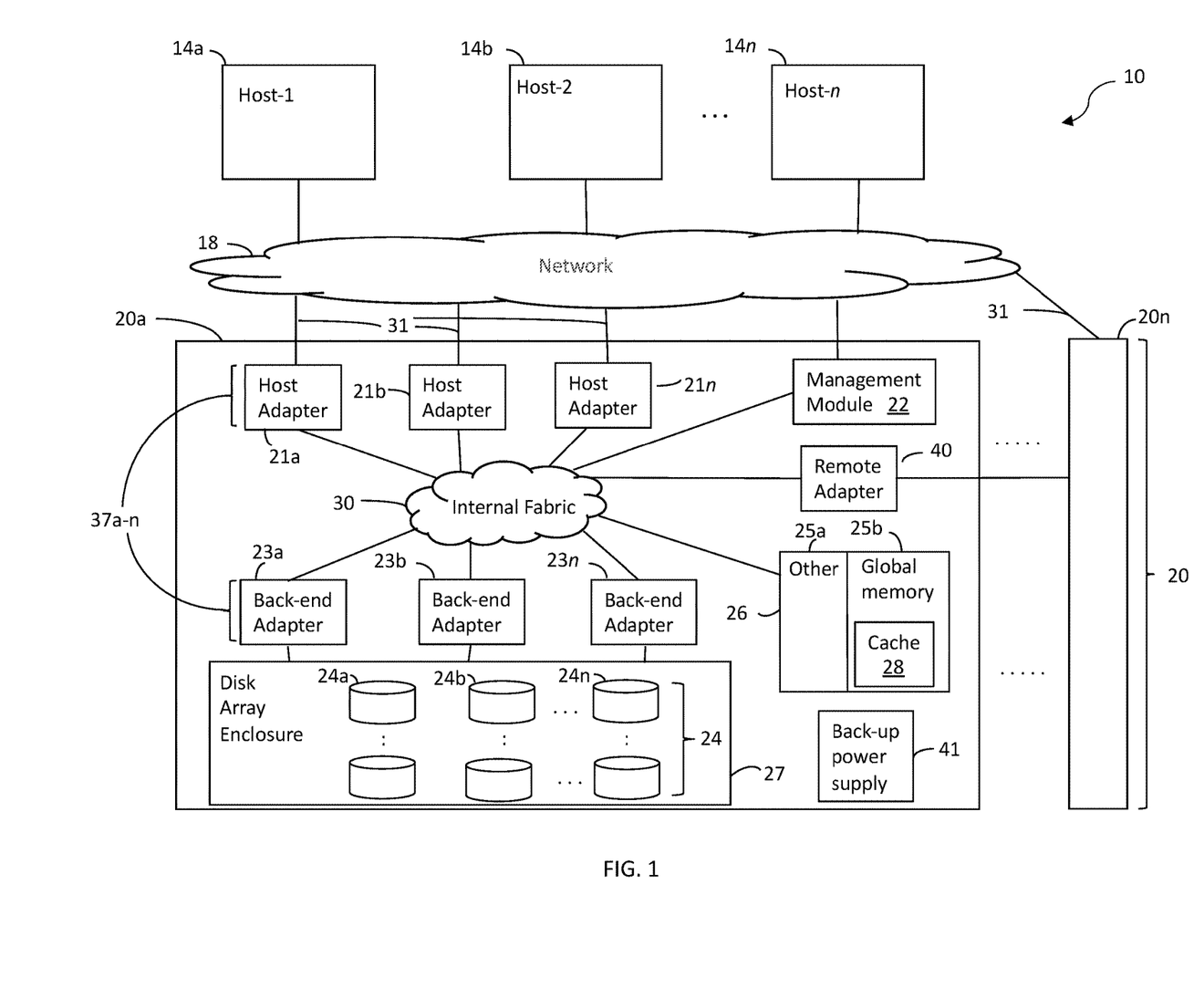
FIG. 1 is a block diagram illustrating an example of a data storage network, according to embodiments of the invention.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
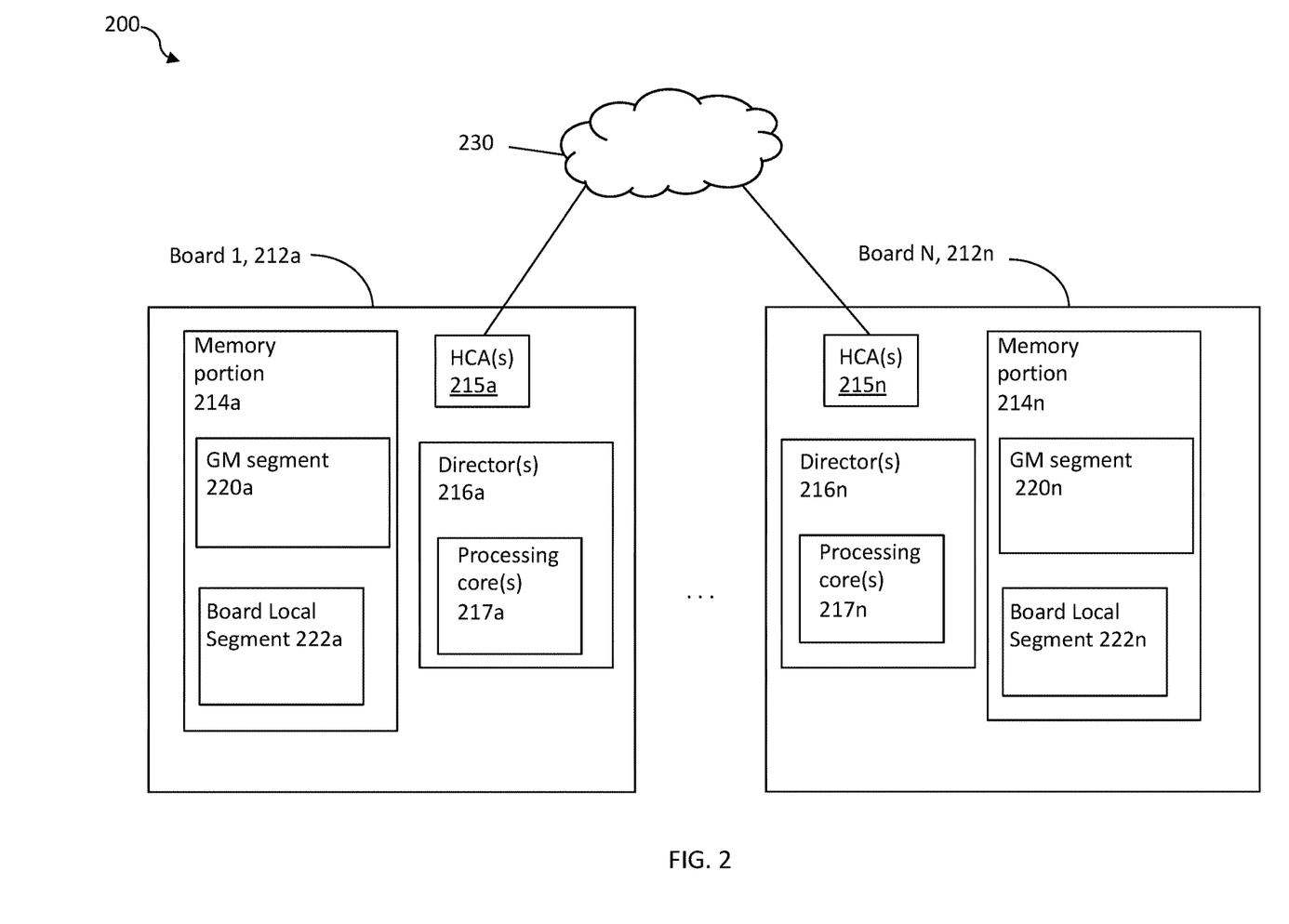
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 200 of a storage system (e.g., 20a) including multiple boards 212a-212n. Storage system 200 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 3:
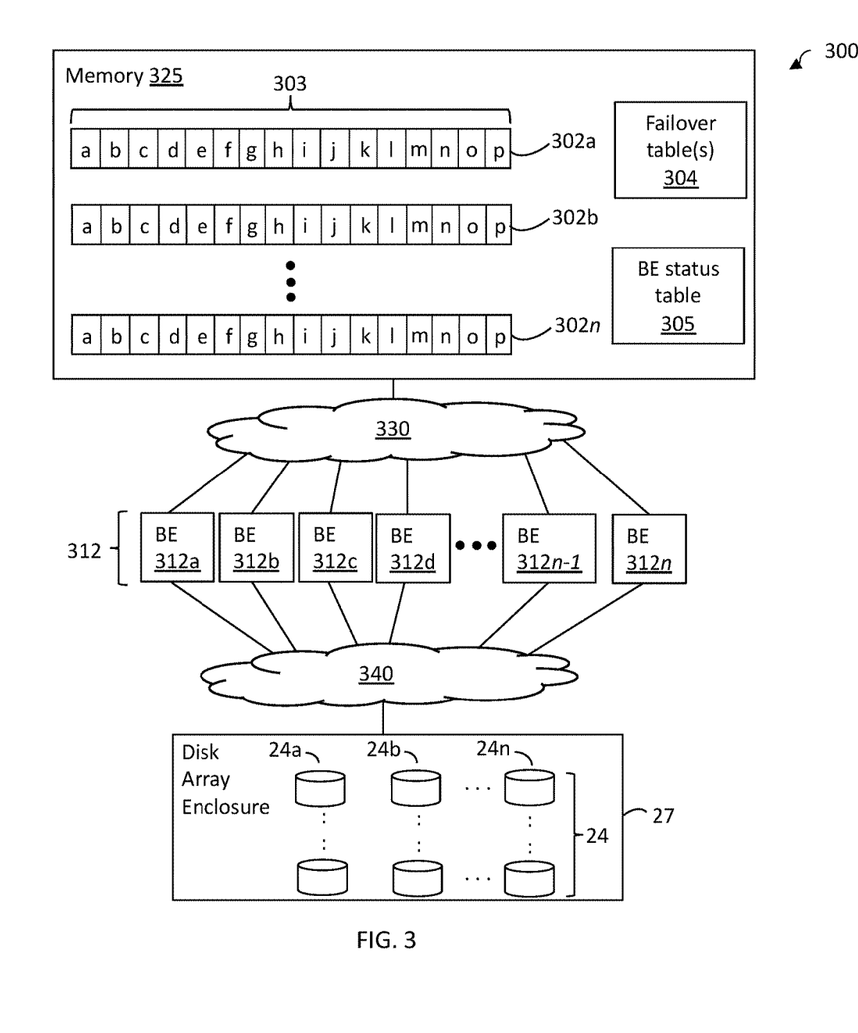
FIG. 3 is a block diagram illustrating an example of a storage system for distributed failover of a back-end director, according to embodiments of the invention.

FIG. 3 is a block diagram illustrating an example of a storage system 300 for distributed failover of a back-end director, according to embodiments of the invention. Other embodiments of a storage system for distributed failover of a back-end director, for example, variations of the storage system 300, are possible and are intended to fall within the scope of the invention. Storage system 300 may be configured to implement functionality and/or components of storage systems 20a and/or storage system 200. Storage system 300 may include any of: memory 325 (e.g., memory 26 or a portion thereof, e.g., global memory 25b); internal fabric 330 (e.g., internal fabric 30 and/or 230); BEs 312a-n (e.g., BEs 23a-n); enclosure fabric 340; DAE 27; other components; or any suitable combination of the foregoing.

Memory 325 may include a plurality or memory pools 302a-302n, where each memory pool may correspond to (e.g., be reserved for) a respective one of BEs 312a-n. For example, memory pools 302a and 302n may be reserved for BEs 312a, 312b and 312n, respectively. Pending writing operations served by BEs 312a-n may be queued in respective memory pools 3002a-n. Each memory pool 302a-n may be divided into a plurality of sub-pools 303. In some embodiments, the number of sub-pools 303 may be defined to be equal to the number (or maximum potential number) of BEs on the storage system, which may allow for maximum distribution of pending write operations of a failed BE. For example, if there are 16 BEs 312a-n, there may be 16 respective sub-pools a-p 303 for each of pools 302a-n. In the event of a failure of one of the 16 BEs, up to 15 active sub-pools may be failed-over to other BEs, with one sub-pool retained by the failed BE (e.g., for reasons described elsewhere herein). For a given BE 312a-n, pending write operations for the BE may be distributed (e.g., evenly and/or in accordance with a predefined algorithm) among the sub-pools (e.g., a-p) of the BE.

Figure 7A:
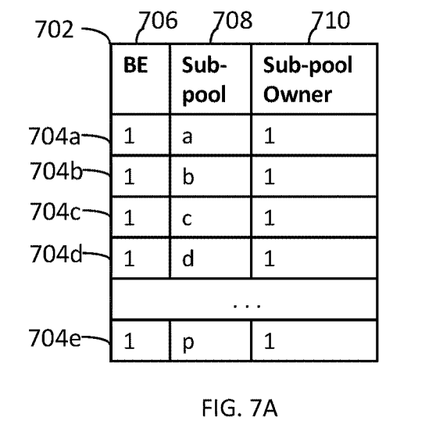
FIGS. 7A-7D are block diagrams of a data structure for defining the current ownership of sub-pools of a memory pool of a back-end director, according to embodiments of the invention.
Figure 7B:
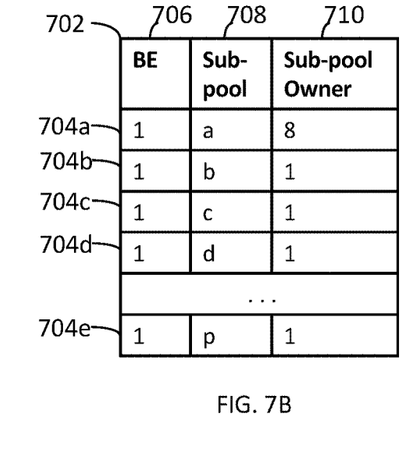
Figure 7C:
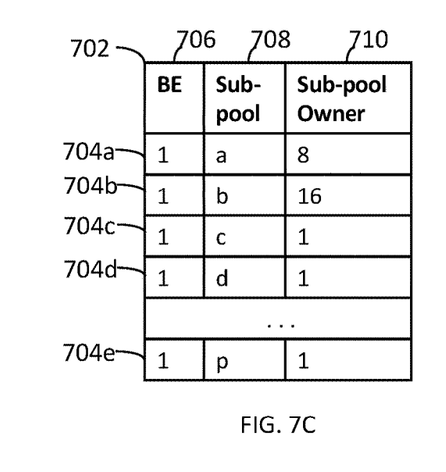
Figure 7D:
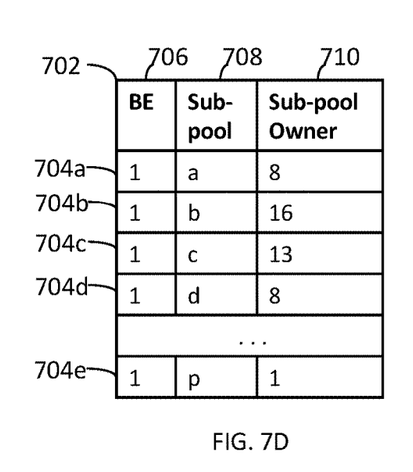
Figure 8A:
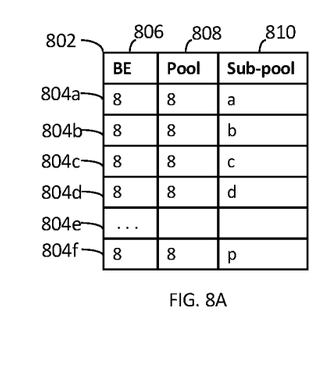
FIGS. 8A-8D are block diagrams of a data structure for defining the sub-pools currently owned by a back-end director, according to embodiments of the invention.

Memory 325 may include failover table(s) 304, which may be used to track ownership of sub-pools by BEs before, during and after failover and failback. Failover table(s) 304 may include one or more memory pool tables 702 and/or sub-pool ownership 802 described elsewhere herein, which may be used as described in more detail elsewhere herein.

BE status table 305 may be used to track the status of each BE 312a-n, for example, whether the BE is inactive (e.g., enabled but not active; i.e., capable of processing I/O operations but currently idle), active (i.e., currently processing I/O operations or recovered from failure) or failed. Other statuses are possible. BE status table 305 may include a plurality of entries, where each entry represents a BE. Each entry may include a BE ID and a status of the BE. BE status table 305 may be used when failing over and failing back BEs, as described in more detail elsewhere herein.

In some embodiments, each of BEs 312a-n may be configured to be capable of writing data to any of physical storage devices of physical storage devices 24 of DAE 27. For example, each of BEs 312a-n may be communicatively coupled by DAE fabric 340 to each of the plurality of physical storage devices. In some embodiments, one or more physical storage devices 24 may be configured in accordance with NVMe, for example, as an NVMe SSD or NVMe SSD, and one or more BEs 312a-n may be configured to communicate with such NVMe storage devices over DAE fabric 340 in accordance with NVMf. DAE fabric 340 may include any of a variety of types of communication media, for example, IB or other types of communication media described herein, and BEs 312a-n may be configured to communicate over DAE 340 with physical storage devices 24 in accordance with any of a plurality of technologies, including, for example: SCSI, ESCON, FC, iSCSI, FCoE, GIGE, NVMf, other technologies, or any suitable combinations of the foregoing, each of which may have one or more associated standard specifications. In some embodiments, DAE fabric 340 or a portion thereof may be part of internal fabric 330.

Distributed failover of a failed BE and failback thereof when it recovers using storage system 300 will now be described.

Figure 4:
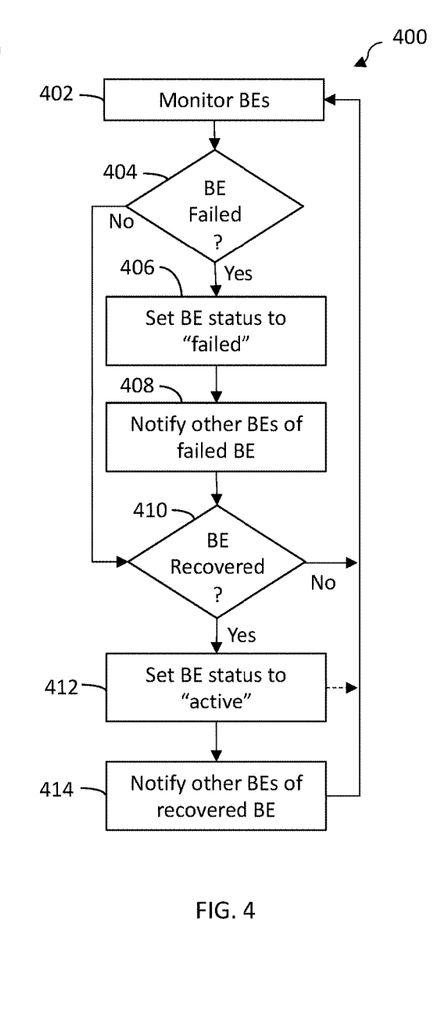
FIG. 4 is a flowchart illustrating an example of a method of initiating failover and failback of a back-end director of a storage system, according to embodiments of the invention.

FIG. 4 is a flowchart illustrating an example of a method 400 of initiating failover and failback of a back-end director of a storage system, according to embodiments of the invention. Other embodiments of a method of initiating failover and failback of a back-end director of a storage system, for example, variations of the method 400, are possible and are intended to fall within the scope of the invention. Any of storage systems 20a, 200 or 300 may be configured (e.g., in hardware, firmware and/or software) to perform method 400 or parts thereof. For example, any of BEs 312a-n, BEs 23a-23n, management module 22 and/or another component may be configured to perform at least part of method 400.

In step 402, the BEs of a storage system may be monitored to ensure it is working and/or performing to a suitable level (e.g., according to predefined values), for example, using any of a variety of known techniques. It may be determined in step 404 whether a BE has failed. If so, a status of the BE, for example, in BE status table 305, may be changed to "failed" in step 406, and other BEs notified of the failed BE in step 408.

In step 410, it may be determined whether a BE has been recovered, and, if so, a status of the BE, for example, in BE status table 305, may be changed to "active" in step 412, and other BEs notified of the failed BE in step 414. In some embodiments, other BEs may not be notified of the recovered BE, as the status change may be learned by accessing BE status table 305.

Step 410 may be performed after performance of step 408 or directly after performance of step 404 if it is determined that a BE has not failed. It should be appreciated that the BE determined to be recovered in step 410 may be a different BE than the BE determined to have failed in step 404. That is, multiple BEs may fail and recover during performance of method 400, for example, at difference times.

While the steps 402, 404 and 406 are illustrated as being discrete steps performed serially, it should be appreciated that these steps may collectively reflect the monitoring of BEs and the detection of one or more BE failures and recoveries asynchronously and perhaps concurrently to one another.

Figure 5:
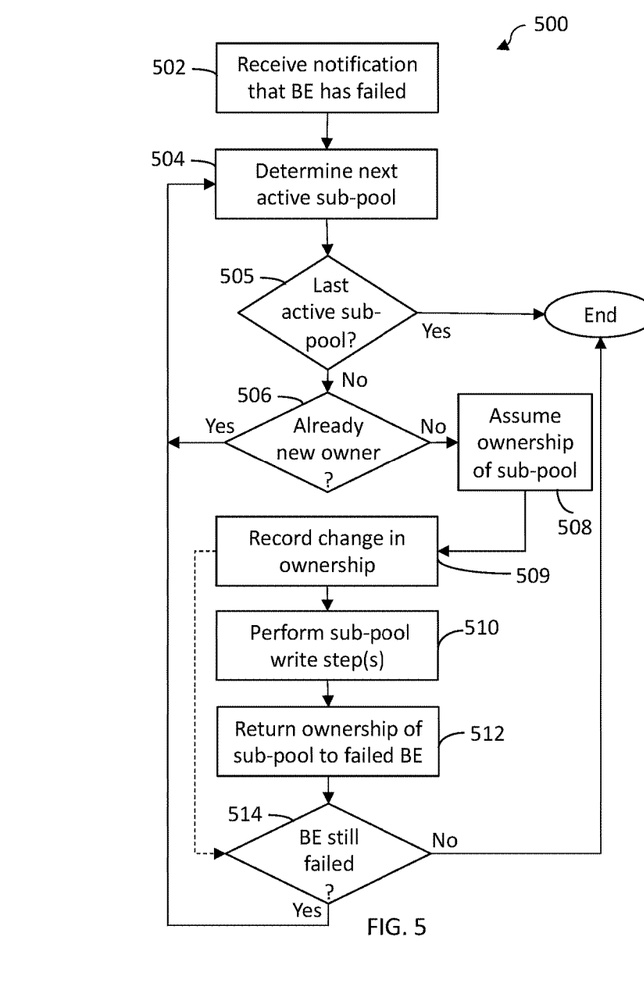
FIG. 5 is a flowchart illustrating an example of a method of performing distributed failover of a back-end director of a storage system, according to embodiments of the invention.

FIG. 5 is a flowchart illustrating an example of a method 500 of performing distributed failover of a back-end director of a storage system, according to embodiments of the invention. Other embodiments of a method of performing distributed failover of a back-end director of a storage system, for example, variations of the method 500, are possible and are intended to fall within the scope of the invention. Any of storage systems 20a, 200 or 300 may be configured (e.g., in hardware, firmware and/or software) to perform method 500 or parts thereof. For example, any of BEs 312a-n, BEs 23a-23n, management module 22 and/or another component may be configured to perform at least part of method 500. In some embodiments, method 500 is separately performed by each of one or more (e.g., all) active BEs of a storage system in response to the detection that a BE has failed in step 404 of method 400, where method 400 and/or step 404 may be performed by another component of the storage system.

In step 502, a notification may be received, for example, by an active BE from another component, that a BE has failed. In some embodiments, the active BE itself (e.g., logic executing therein) may determine that the BE has failed. In response to the notification or determination that a BE has failed, one or more active BEs may attempt to take ownership of one or more sub-pools of the failed BE and proceed to execute the write steps of the pending write operations therein, for example, by performance of steps 504-514.

Performance of steps 504-514 may include considering each sub-pool of the failed BE, for example, in a predefined order, to attempt to take ownership (i.e., control) thereof. For example, steps 504-514 may include traversing the entries of a data structure defining the sub-pools of the memory pool of the failed BE, for example, memory pool table 702 described in relation to FIGS. 7A-7D.

FIGS. 7A-7D illustrate a data structure 702, at different points in time, for defining the current ownership of sub-pools of a memory pool of a back-end director. Other embodiments of a data structure for defining the current ownership of sub-pools of a memory pool of a back-end director, for example, variations of data structure 702, are possible and are intended to fall within the scope of the invention. Data structure 702 may be referred to herein as a memory pool table and is referenced throughout the description of method 500.

Memory pool table 702 may define the sub-pools of the memory pool reserved for (e.g., owned by) a BE, and specify the current owner of each sub-pool. Memory pool table 702 may include a plurality of entries 704a-e. Each entry may specify: an ID of the BE that owns the pool in BE ID column 706; an ID of the sub-pool represented by the entry in sub-pool ID column and an ID of the BE that currently owns the sub-pool represented by the entry in sub-pool owner column 710. In some embodiments, the memory pool table 702 also includes a sub-pool status column (not shown) for which each entry may specify a status of the represented sub-pool, for example, whether the sub-pool is active (i.e., has one or more pending write operations included therein) or inactive (i.e., has no pending write operations included therein).

In some embodiments, a single memory pool table 702 may be provided to serve an entire data storage system (e.g., storage system 300), in which case all BE memory pools of the data storage system may be represented therein. In other embodiments, a memory pool table 702 may be provided for each BE memory pool, in which case the BE ID column 706 may not be necessary as all entries may be for the same BE, and a BE ID may apply to, and be used to reference, the memory pool table 702 as a whole.

Initially, e.g., upon activation of a BE, and under typical conditions, all of the sub-pools of a BE's memory pool may be owned by a BE itself. For example, FIG. 7A illustrates that all of the sub-pools of BE 1 are currently owned by BE 1. During a time in which a BE is in a failed state and for some time after the BE recovers from a failed state, one or more sub-pools of the BE's memory pool may be temporarily owned by other BEs, as illustrated, for example, in FIGS. 7B-7D.

As an alternative to accessing memory pool table 702, or in conjunction therewith, step 502 may include accessing a sub-pool ownership table, for example, having the same or similar structure as sub-pool ownership table 802 depicted in FIGS. 8A-8D. FIGS. 8A-8D are block diagrams of a data structure 802 for defining the sub-pools currently owned by one or more back-end directors. Other embodiments of a data structure for defining the sub-pools currently owned by one or more back-end directors, for example, variations of data structure 802, are possible and are intended to fall within the scope of the invention. Data structure 802 may be referred to herein as a sub-pool ownership table. Sub-pool ownership table 802 may be used in performance of method 500 and/or method 600 described elsewhere herein in relation to FIG. 6.

Sub-pool ownership table 802 may define the sub-pools currently owned by one or more BEs, which for each BE may include sub-pools of its own memory pool and sub-pools for which the BE has taken temporary ownership from a failed BE. Sub-pool ownership table 802 may include a plurality of entries, including any of entries 804a-h, each entry representing a separate sub-pool on a data storage system. Each entry may specify: an ID of the BE that owns the sub-pool in BE ID column 806; an ID of the memory pool that includes the sub-pool represented by the entry in memory pool ID column 808; and an ID of the sub-pool represented by the entry in sub-pool ID column 810. For ease of illustration, in FIGS. 8A-8D, a memory pool ID has a same value as the BE ID of the BE that owns the memory pool. It should be appreciated that these values may be different.

In some embodiments, a single sub-pool ownership table 802 may be provided to serve an entire data storage system (e.g., storage system 300), in which case sub-pools owned by any BEs of the data storage system may have entries therein. In other embodiments, a separate sub-pool ownership table 802 may be provided for each BE, in which case the BE ID column 806 may not be necessary as all entries may be for the same BE, and a BE ID may apply to, and be used to reference, the sub-pool ownership table 802 as a whole.

Figure 8B:
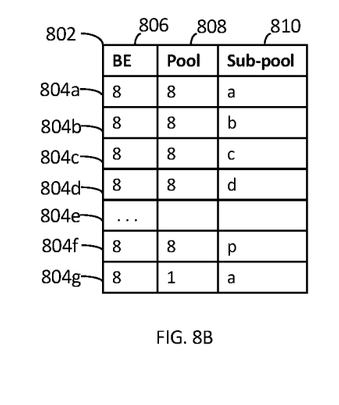
Figure 8C:
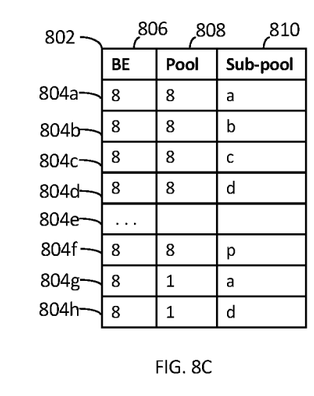
Figure 8D:
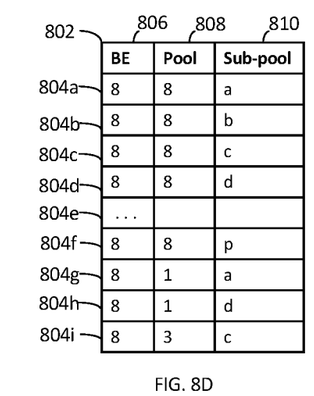

Initially, e.g., upon activation of a BE, and under typical conditions (e.g., when no BEs are currently failed), all of the sub-pools of a BE's memory pool may be owned by the BE itself, and thus each BE only owns the sub-pools of its own memory pool. For example, FIG. 8A illustrates that BE 8 only owns the sub-pools a-p (i.e., 8a-8p) of its own memory pool. During a time in which one or more BEs other than BE 8 are in a failed state and for some time after the one or more other BEs recover from a failed state, one or more sub-pools of the one or more other BE's memory pool may be temporarily owned by BE 8. For example, FIG. 8B illustrates sub-pool ownership table 802 at a point in time at which BE 8 has ownership of sub-pool 1a of memory pool 1 of a first failed BE 1. FIG. 8C illustrates sub-pool ownership table 802 at a point in time at which BE 8 has ownership of sub-pools 1a and 1d of memory pool 1 of the first failed BE 1. FIG. 8D illustrates sub-pool ownership table 802 at a point in time at which BE 8 has ownership of sub-pools 1a and 1d of the memory pool 1 and sub-pool 3c of memory pool 3 of a second failed BE. It should be appreciated that additional sub-pools of the same and/or additional failed BEs may be owned by BE 8 at different points in time.

It should be appreciated that embodiments of the inventions may include and utilize one or more memory pool tables 702 and/or one or more sub-pool ownership tables 802, or a suitable combination thereof in implementing failover and failback according to embodiments of the invention described herein.

Returning to method 500, in step 504, a next active sub-pool of the memory pool of the failed BE may be determined. For example, on a first pass through a loop defined by steps 504-514, the first active sub-pool may be determined, e.g., by accessing a first active entry in the memory pool table 702 or sub-pool ownership table 802 for the failed DE. Determining a next active sub-pool may include determining a next sub-pool entry of memory pool 702 that specifies that the sub-pool is active (e.g., in a sub-pool status column), or accessing a next entry of the memory pool table and using the sub-pool ID to access the sub-pool itself in memory to determine whether there are any pending write operations.

In response to determining the next active sub-pool in step 504, it may be determined in step 505 whether the determined next active sub-pool is a last active sub-pool of the memory pool of the failed BE, for example, by reference to memory pool table 702. Memory pool table 702 also may include a field or flag indicating when there is only one active sub-pool remaining for a memory pool, which may be set upon detection of this condition (e.g., by another component monitoring for same). If it is determined in step 505 that the determined next active sub-pool is the last active sub-pool, method 500 may end, which has the effect of retaining ownership of one active sub-pool of the memory pool for the failed BE, the potential benefits of which are described elsewhere herein.

If it is determined in step 505 that the determined next active sub-pool is not the last active sub-pool, then, in step 506, it may be determined whether the active sub-pool already has a new owner. For example, a plurality of active BEs, after having been notified (or having determined) that the failed BE failed, may concurrently perform method 500, in which case another active BE may have already taken ownership of the next active sub-pool. If it is determined in step 506 that another active BE has already taken ownership of the next active sub-pool, then method 500 may return to step 504.

If it is determined in step 506 that another active BE has not already taken ownership of the active sub-pool, then the active BE (or another component) performing method 500 may: take ownership of the sub-pool in step 508, record ownership of the change in ownership in one or more data structures (e.g., memory pool table 702 and/or sub-pool ownership table 802) in step 509, and performs the write steps of the pending write operations in the sub-pool in step 510. At the completion of each write operation specified in the sub-pool, the entry for the write operation may be removed from sub-pool.

After completion of the write steps of the failed-over sub-pool by another BE, the ownership of the sub-pool may be returned to the failed BE in step 510, which may include updating the one or more entries for the sub-pool in memory pool table 702 and/or sub-pool ownership table 802. In step 512, it may be determined whether the failed BE is still failed, for example, by accessing BE status table 305 for the failed BE, as the failed BE may have recovered at some point during the performance of steps 504-512. If the failed BE has recovered, method 500 may end. If the failed BE is still failed, method 500 may proceed back to step 504.

It should be appreciated that while the BE is performing the write steps for the failed-over sub-pool in step 510, it may continue performing iterations of steps 504-514 for other sub-pools of the failed BE, as illustrated by the dashed pointed line leaving step 509 in FIG. 5. Thus, a BE may be performing multiple instances of steps 504-514 concurrently.

An example of a performance of method 500 for a storage system having sixteen BEs 1-16 will now be described with reference to FIGS. 7A-7D and 8A-8D. In step 502, a notification may be received by BE 8 (which also may have been received by BEs 2-7 and 9-16) that BE 1 has failed. BE 8 may be the first BE of BEs 2-16 to start performing method 500. BE 8 may determine from memory pool table 702, in step 504, that a next (e.g., first) sub-pool of failed BE 1 is sub-pool 1a, and may determine in step 506 that sub-pool 1a does not already have a new owner. In response to this determination, BE 8 may record the change of ownership of sub-pool 1a in memory pool table 702, as reflected in entry 704a in FIG. 7B, and may record the change of ownership of sub-pool 1a in sub-pool ownership table 802, as reflected by the addition of entry 804g in FIG. 8B.

BE 8 may perform the write steps of the pending write operation of sub-pool 1a in step 510. When BE 8 completes the write steps of all pending write operations of sub-pool 1a, BE 8 may return ownership of sub-pool 1a to BE 1, which may include updating entry 704a of memory pool table 702 to return to the value shown in FIG. 7A, and removing entry 804g from sub-pool ownership table 804.

While BE is performing step 510 for sub-pool 1a, BE 8 concurrently may determine in step 514 that the BE is still failed and return to step 504. However, between the first and second performances of step 504 by BE 8, BE 16 may have performed steps 504-509, resulting in BE 16 having taken ownership of the next active sub-pool 1b of BE 1, as reflected by entry 704B of memory table 702 in FIG. 7C. Further, after performances of step 504 by BE 16, but before the second performance of step 504 by BE 8, BE 13 may have performed steps 504-509, resulting in BE 13 taking ownership of the next active sub-pool 1c of BE 1. The immediately succeeding performance of step 504 following performance of step 504 by BE 13 may be the second performance of step 504 by BE 8, resulting in BE 8 taking ownership of sub-pool 1d of failed BE 1. The four performances of steps 504-509 as described above, collectively, by BEs 8, 13 and 16 may result in entries 704a-704d illustrated in FIG. 7D. At a later point in time after BE has recovered, for example, after performance of method 600, memory pool table 702 and sub-pool ownership table 802 may return to the states reflected in FIGS. 7A and 7B, respectively.

Figure 6:
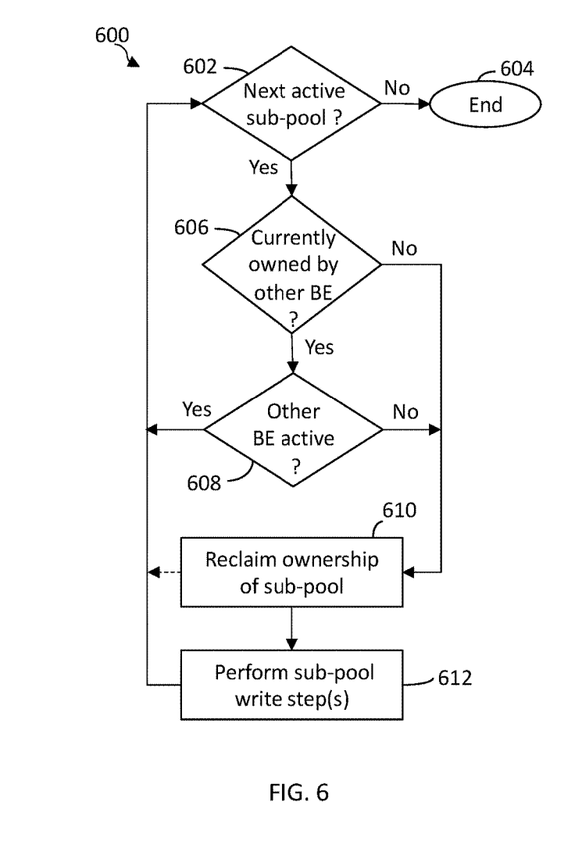
FIG. 6 is a flowchart illustrating an example of a method of performing failback of a back-end director of a storage system, according to embodiments of the invention.

FIG. 6 is a flowchart illustrating an example of a method 600 of performing failback of a back-end director of a storage system, according to embodiments of the invention. Other embodiments of a method of performing failback of a back-end director of a storage system, for example, variations of the method 600, are possible and are intended to fall within the scope of the invention. Any of storage systems 20a, 200 or 300 may be configured (e.g., in hardware, firmware and/or software) to perform method 600 or parts thereof. For example, any of BEs 312a-n, BEs 23a-23n, management module 22 and/or another component may be configured to perform at least part of method 600.

Method 600 may be performed in response to a BE recovering after having failed, for example, by the recovering BE itself. In a step 602, a next active sub-pool (e.g., a first sub-pool on a first performance of step 602) of the memory pool of the recovered BE may be determined, for example, by accessing one or more failover table(s) 304 such as, for example, a memory pool table 702 or a sub-pool ownership table 802. If there are no more active sub-pools (e.g., after several iterations of steps 602-612), method 604 may end.

If it is determined in step 602 that there is a next active sub-pool, then, in step 606, it may be determined whether the active sub-pool is currently owned by another BE, for example, by accessing a sub-pool owner column 710 of table 702 for the entry 704 representing the next sub-pool, or sub-pool owner column 810 of sub-pool owner table 802 for the entry 804 representing the next sub-pool.

If it is determined in step 606 that the next active sub-pool is currently owned by another BE, then in step 608 it may be determined whether the other BE is currently active (e.g., not failed itself). For example, the other BE may have failed after it took ownership of the active-sub-pool, but before it completed the pending write operations thereof. Step 608 may include accessing BE status table 305. If it is determined in step 608 that the other BE that owns the active sub-pool is active, then method 600 may return to step 602.

If it is determined in step 608 that the other BE owning the sub-pool is not active, or if it is determined in step 606 that the sub-pool is not owned by another BE (e.g., ownership may have been previously retained for the recovered BE during its failure for reasons described elsewhere herein), then the ownership of the sub-pool may be reclaimed by the recovered BE, including, for example, updating one or more entries for the sub-pool in memory pool table 702 and/or sub-pool ownership table 802. In step 612, the recovered BE may perform the write steps of any pending write operations remaining in the sub-pool.

It should be appreciated that while the recovered BE is performing the write steps for the pending write operations in step 612, it may continue performing iterations of steps 602-610 for other sub-pools of the failed BE, as illustrated by the dashed pointed line leaving step 610 in FIG. 6. Thus, a BE may be performing multiple instances of steps 602-612 concurrently.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 400, 500 and 600, or parts thereof, may be implemented using one or more of the systems and/or data structures described in relation to FIGS. 1-3, 7A-7D and 8A-8D, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage system including a plurality of physical storage devices, a plurality of directors processing I/O operations for the plurality of physical storage devices, and a memory including a plurality of memory pools, each of the plurality of memory pools corresponding to a respective one of the plurality of directors and including a plurality of sub-pools for use by the respective director in the processing of I/O operations, a method comprising:
receiving an indication that a first of the plurality of directors has failed, wherein the plurality of directors denotes all back-end directors in the storage system configured to access the plurality of physical storage devices;
performing processing by all active, non-failed back-end directors of the storage system to attempt to take ownership of at least one of the plurality of sub-pools of a first memory pool of the plurality of memory pools corresponding to the first director that failed, wherein said processing includes determining whether the at least one sub-pool of the plurality of sub-pools of the first memory pool corresponding to the first director includes pending write operations;
responsive to said processing by a second of the plurality of directors, assigning ownership of the at least one sub-pool to the second director; and
the second director processing the pending write operations of the at least one sub-pool.

2. The method of claim 1, further comprising:
assigning ownership of at least one other sub-pool of the first memory pool to a third of the plurality of directors.

3. The method of claim 1, wherein the step of determining includes the second director determining, for at least two of the plurality of sub-pools of the first memory pool:
whether another of the plurality of directors is assigned ownership of the each of the at least two sub-pools; and if no other of the plurality of directors is assigned ownership of each of the at least two sub-pools, assigning ownership of the at least two sub-pools to the second director.

4. The method of claim 1, wherein the step of determining whether the at least one of the plurality of sub-pools of the first memory pool includes pending write operations is performed separately by each active, non-failed back-end director of the storage system.

5. The method of claim 1, wherein the step of determining includes determining that at least two of the plurality of sub-pools of the first memory pool include pending write operations, and wherein the method further includes:
maintaining ownership of at least one of the at least two sub-pools with the first director.

6. The method of claim 1, further comprising:
the second director completing processing of the pending write operations of the at least one sub-pool; and
in response to the completion of the processing, re-assigning ownership of the at least one sub-pool back to the first director.

7. The method of claim 1, further comprising:
the first director becoming active again after having failed;
determining which of the plurality of sub-pools of the first memory pool have ownership currently assigned to another of the plurality of directors; and
for each sub-pool of the first memory pool determined to have ownership currently assigned to another of the plurality of directors, performing first processing including:
determining whether the other director having ownership is active or failed,
if the other director is failed, re-assigning ownership of the sub-pool back to the first director, and
if the other director is active, maintaining ownership of the sub-pool with the other director until completion by the other director of any pending write operations of the sub-pool.

8. The method of claim 1, wherein each of the plurality of directors are communicatively coupled by a fabric to each of the plurality of physical storage devices.

9. A storage system comprising:
a plurality of physical storage devices;
a plurality of directors processing I/O operations with the plurality of physical storage devices, wherein the plurality of directors denotes all back-end directors in the storage system configured to access the plurality of physical storage devices;
a memory including a plurality of memory pools, each of the plurality of memory pools corresponding to a respective one of the plurality of directors and including a plurality of sub-pools for use by the respective director in the processing of I/O operations,
wherein the memory has code stored thereon that, when executed, performs a method including:
receiving an indication that a first of the plurality of directors has failed;
performing processing by all active, non-failed back-end directors of the storage system to attempt to take ownership of at least one of the plurality of sub-pools of a first memory pool of the plurality of memory pools corresponding to the first director that failed, wherein said processing includes determining whether the at least one sub-pool of the plurality of sub-pools of the first memory pool corresponding to the first director includes pending write operations;
responsive to said processing by a second of the plurality of directors, assigning ownership of the at least one sub-pool to the second director; and
the second director processing the pending write operations of the at least one sub-pool.

10. The storage system of claim 9, wherein the method further includes:
assigning ownership of at least one other sub-pool of the first memory pool to a third of the plurality of directors.

11. The storage system of claim 9, wherein the step of determining includes the second director determining, for at least two of the plurality of sub-pools of the first memory pool:
whether another of the plurality of directors is assigned ownership of the each of the at least two sub-pools; and
if no other of the plurality of directors is assigned ownership of each of the at least two the sub-pools, assigning ownership of the at least two sub-pools to the second director.

12. The storage system of claim 9, wherein the step of determining whether the at least one of the plurality of sub-pools of the first memory pool includes pending write operations is performed separately by each active, non-failed back-end director of the storage system.

13. The storage system of claim 9, wherein the step of determining includes determining that at least two of the plurality of sub-pools of the first memory pool include pending write operations, and wherein the method further includes:
maintaining ownership of at least one of the at least two sub-pools with the first director.

14. The storage system of claim 9, wherein the method further includes:
the second director completing processing of the pending write operations of the at least one sub-pool; and
in response to the completion of the processing, re-assigning ownership of the at least one sub-pool back to the first director.

15. The storage system of claim 9, wherein the method further includes:
the first director becoming active again after having failed;
determining which of the plurality of sub-pools of the first memory pool have ownership currently assigned to another of the plurality of directors; and
for each sub-pool of the first memory pool determined to have ownership currently assigned to another of the plurality of directors, performing first processing including:
determining whether the other director having ownership is active or failed,
if the other director is failed, re-assigning ownership of the sub-pool back to the first director, and
if the other director is active, maintaining ownership of the sub-pool with the other director until completion by the other director of any pending write operations of the sub-pool.

16. The storage system of claim 9, wherein each of the plurality of directors are communicatively coupled by a fabric to each of the plurality of physical storage devices.

17. For a storage system including a plurality of physical storage devices, a plurality of directors processing I/O operations with the plurality of physical storage devices, and a memory including a plurality of memory pools, each of the plurality of memory pools corresponding to a respective one of the plurality of directors and including a plurality of sub-pools for use by the respective director in the processing of I/O operations, one or more non-transitory computer-readable media having software stored thereon, the software comprising:
- executable code that receives an indication that a first of the plurality of directors has failed, wherein the plurality of directors denotes all back-end directors in the storage system configured to access the plurality of physical storage devices;
- executable code that controls processing performed by all active, non-failed back-end directors of the storage system to attempt to take ownership of at least one of the plurality of sub-pools of a first memory pool of the plurality of memory pools corresponding to the first director that failed, wherein said processing includes determining whether the at least one of the plurality of sub-pools of the first memory pool corresponding to the first director includes pending write operations;
- executable code that, responsive to said processing performed by a second of the plurality of directors, assigns ownership of the at least one sub-pool to the second director; and
- executable code that controls the second director to process the pending write operations of the at least one sub-pool.

18. The one or more non-transitory computer-readable media of claim 17, wherein the software further comprises:
- executable code that assigns ownership of at least one other sub-pool of the first memory pool to a third of the plurality of directors.

19. The one or more non-transitory computer-readable media of claim 17, wherein the executable code that determines whether the at least one of the plurality of sub-pools of the first memory pool includes pending write operations is executed separately by each active, non-failed back-end director of the storage system.

20. The one or more non-transitory computer-readable media of claim 17, wherein the executable code that determines whether at least one of the plurality of sub-pools of a first memory pool corresponding to the first director includes pending write operations includes executable code that determines that at least two of the plurality of sub-pools of the first memory pool include pending write operations, and wherein the software further comprises:
- executable code that maintains ownership of at least one of the at least two sub-pools with the first director.

* * * * *